United States Patent

[11] 3,564,299

[72] Inventors Andrew G. Varadi
Briarwood;
Richard B. Rubinstein, New York, N.Y.

[21] Appl. No. 791,588
[22] Filed Jan. 16, 1969
[45] Patented Feb. 16, 1971
[73] Assignee General Instrument Corporation
Newark, N.J.

[54] CLOCK GENERATOR
14 Claims, 6 Drawing Figs.

[52] U.S. Cl. .......... 307/269,
307/205, 307/208, 307/237, 307/251, 307/279
[51] Int. Cl. .......... H03k 17/26
[50] Field of Search .......... 307/205,
251, 221, 279, 304, 208, 237, 269

[56] References Cited

UNITED STATES PATENTS

| | | | |
|---|---|---|---|
| 3,320,434 | 5/1967 | Ott | 307/237X |
| 3,386,038 | 5/1968 | Johansen et al. | 307/269X |
| 3,431,433 | 3/1969 | Ball et al. | 307/251X |
| 3,440,444 | 4/1969 | Rapp | 307/205X |
| 3,480,796 | 11/1969 | Polkinghorn et al. | 307/279X |

*Primary Examiner*—John S. Heyman
*Attorney*—James and Franklin

ABSTRACT: A clock generator develops an output timing signal from two input signals having a time interval therebetween. A clamping device controlled by the input signals is effective to maintain said output signal at its desired level during the interval between the input signals, and means are provided to maintain the voltage level at the input node at an appropriate level during that interval.

PATENTED FEB 16 1971

3,564,299

Figure 1:
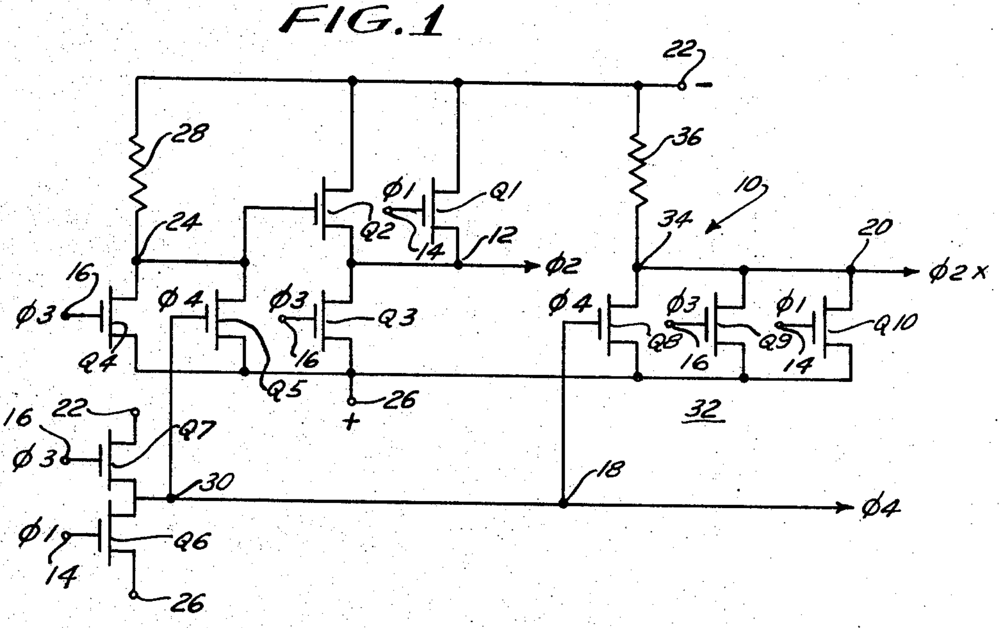

INVENTORS
ANDREW G. VARADI
RICHARD B. RUBINSTEIN
BY James and Franklin
ATTORNEY

CLOCK GENERATOR

The present invention relates to circuitry for generating timed clock pulses, and particularly to a circuit for generating timed signals from two sequential input signals.

Accurately timed clock signals are widely used in the operation of logic circuitry such as that conventionally found in computers. Many circuits are known which generate such clock signals at desired high frequencies and accuracy. These clock pulses are used to control the timed operation of the various logic blocks in the computer such as counters, shift registers, memory units and the like. The prime requirement for clock pulses utilized in these logic circuits is that they be properly related to one another in the desired phase relation and that they have the proper amplitude and shape for accurate logic operation of the various circuits controlled thereby.

In recent years, logic circuitry has been developed utilizing what may be defined as four-phase logic, in which the timed control of the operation of the various logic circuits is determined by four sequential clock signals having a specified time and phase relation with one another. One type of four-phase logic clock includes four clock phases in which two of the clock phases are unique or nonoverlapping, and the other two phases occur during the period of one of the unique phases respectively, and extend in time until the onset of the following unique clock phase. A typical logic system utilizing clocks of this type is a memory system such as that described in copending application entitled "Read-Only Memory," Ser. No. 791,759, filed in the name of Andrew G. Varadi et al. on even date herewith, and assigned to the assignee of the present invention.

In previously filed application also entitled "Clock Generator" filed in the name of Richard B. Rubinstein et al. Ser. No. 766,489 filed on Oct. 10, 1968, there is disclosed a clock circuit of this type in which two overlapping clock pulses are internally generated from two spaced input signals. To overcome the effects of the feedback of positive signals from the load circuits through the clock generator circuit output node to which those circuits are connected the clock circuit disclosed in said application provides a clamping switch device which is effective when actuated to clamp the output node to its desired operative level during the interval between the first and second input clock signals. That clamping device has a control terminal connected to an input node, the signal level at that input node determining whether that clamping device is conductive. That clock generator circuit has been found to be highly effective in certain applications in which a substantial number of load circuits are controlled by the generated clock pulses and in which the pulses are generated at relatively high frequencies. It has been found, however, that when the number of load circuits is further increased and when the frequency of the clock pulses increased to the range of 2 to 3 mHz, the problem of transient signal feedback from the load circuits through the output node becomes more significant, and there is sufficiently high signal transfer through the interelectrode capacitance of the clamping device to the input node to undesirably affect the signal at the input node. Thus, for the more rigorous load and frequency requirements which must be satisfied in certain applications of the clock generator, the signal level at the input node is undesirably varied from a level at which it actuates the clamping device to a different, erroneous level at which it is no longer effective to actuate the clamping device. As a result, the clamping device may be turned off in the interval between the first and second input signals, that is, in the period in which it is most critical to provide clamping action to the output signal, and the output signal generated at that output node is no longer maintained at its proper operative logic level during that period. Clock signals of improper sense will therefore be applied to the various load circuits connected to the output node, thus rendering those load circuits no longer able to perform their desired logic and control functions in the system. Incorrect system operation will result.

Consequently, the Rubinstein et al. clock generator is limited in its applicability as to the number of load circuits which can be reliably controlled by the generated clock signals as well as the frequency of the clock signals applied to these load circuits.

It is a prime object of the present invention to provide a clock generator which can be utilized to reliably provide timing signals to a greater number of load circuits at relatively higher clock signal frequencies than has heretofore been practicable.

It is a further object of the present invention to provide a clock generator of this type which is capable of developing overlapping clock signals from two spaced input signals, which clock signals remain substantially unimpaired by feedthrough signals from the load circuits receiving those signals.

It is yet a further object of the present invention to provide a generator circuit capable of developing an output signal having a predetermined phase relation to a pair of spaced input clock signals, in which the output signal is affirmatively maintained at its output level in the period between the two input signals.

It is another object of the present invention to provide a clock generator of the type described, in which an overlapping clock signal is developed at an output node, that output node being maintained affirmatively at its desired level through the operation of a clamping device which is in turn controlled by a signal level developed at an input node in the period between the two input pulses.

It is still a further object of the present invention to provide a clock generator of the type described in which the various devices employed in the circuit are formed on a a chip of semiconductor material, a region of that material being utilized to operatively connect an input node to a potential source to affirmatively maintain the signal level at that node at a desired value during a predetermined period, that level being effective to control the operation of a switch device, which in turn is effective to affirmatively maintain the proper signal level at an output node.

It is a further object of the present invention to provide a clock generator of the type described which is capable of producing a second overlapping clock signal and a third output clock signal which has a greater available signal variation than the two overlapping developed clock signals, and which is formed only in the period between the first and second clock input signals.

It is yet another object of the present invention to provide a clock generator circuit in which the internally developed clock signals are rapidly and accurately charged to their desired levels during their prescribed periods.

To these ends, the present invention provides a clock generator circuit receiving two spaced input clock signals and developing from these two clock signals at least one output signal at an output node, that output signal being affirmatively maintained at its desired level in the period between the first and second input signals. The maintaining of the output signal at its desired level during its interval is effected, as disclosed in said Rubinstein et al. application, by providing a clamping switch device in operative connection between an output node and a first potential source; when that switch device is actuated the signal level at the output node is affirmatively clamped to a first level corresponding to the level of the first potential source. That clamping device is in turn operatively connected to an input node, the signal level of which determines the operation of the clamping device. The present invention provides a conductive means which is effective to connect the input node to the first potential source in the interval between the first and second input signals, thereby to maintain the proper signal level at that input node (i.e. a level which is effective to actuate the clamping device) during that period, thereby to maintain the effective actuation of the clamping device independent of any possible effects produced by feedthrough of signals from the load to the input node.

Switch means controlled by the second input signal are provided to operatively disconnect the input node from the first potential source and to operatively connect that node to a second potential source, thereby to charge it to its second level at the beginning of the second input signal. At this time, the clamping device is turned off and the output signal at the output node is charged to its second operative level corresponding to the level of the second potential source.

The circuit of the present invention is preferably formed on a chip of semiconductor material, the various elements used in that circuit all being formed directly on that chip. The conductive means in the particular embodiment disclosed herein, which as described above is effective to operatively connect the input node to its first potential source, comprises a resistor which is defined by a doped region in that semiconductor material forming a resistance region. The resistance value of that resistor is greater than the conductive resistance of the second switch means so that when the second switch means is actuated by the second input clock signal, the input node will be effectively and quickly charged to the level determined by the second potential source, thereby to remove the actuating signal from the clamping device and to permit the output signal to be charged to its second operative level.

The circuit of this invention also comprises means for developing a second output signal at a second output node, that second output signal being developed at the beginning of the second input signal and terminated at the onset of the subsequent first input signal. The switch means connecting the input node to the second potential source may comprise a pair of switch devices, one being actuated by the second input signal and the other by the second output signal. This arrangement provides for an effective operative connection between the input node and the second potential source during the second input signal, and in the interval between it and the subsequent first input signal.

The clock circuit of this invention also comprises means for developing a third output signal at a third output node, that signal being developed only in the period between the first and second input clock signals, that third output signal being developed from the first and second input signals and the second output signal which respectively actuate the three switching elements of a NOR gate operatively connected between the third output node and the second potential source. In order to avoid the negative threshold voltage drop which would occur if the first potential source were applied at the third output node through a switching device such as a field effect transistor (FET), that third output node is operatively connected to the first potential source through a conductor in the form of a resistor preferably formed by selectively doping a portion of the semiconductor material on which the circuit is formed.

The various electronic switches utilized in the clock generator circuit of this invention are specifically disclosed as field effect transistors which can be readily formed on a single chip of semiconductor material. These transistors comprise a pair of output terminals generally termed the source and drain and a control terminal generally designated the gate. A closed circuit between the source and drain terminals is established when a negative signal is applied to the gate, and an open circuit is established between the output terminals when a positive or ground potential is applied to the gate. Field effect transistors are capable of switching at high speeds and are therefore highly suitable for use in high-speed computer logic circuitry. However, while the use of field effect transistors is preferred and is thus the embodiment here described and illustrated, the present invention may of course be used with any known high-speed switching device.

To the accomplishment of the above, and to such other objects as may hereinafter appear, the present invention relates to a clock circuit for generating overlapping clock pulses from two timed input signals, as defined in the accompanying claims and as described in this specification, taken together with the accompanying drawing in which:

FIG. 1 is a circuit diagram of a preferred embodiment of the present invention; and FIG. 2*a*–2*e* are graphical representations of the timing relation of the input clock pulses and the clock phases developed by the circuit of this invention.

Figures 2A, 2B, 2C, 2D, 2E:
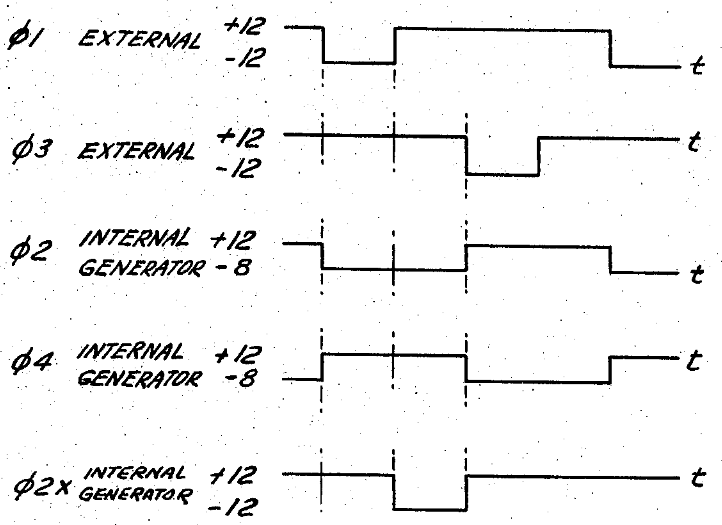

The clock circuit 10 of this invention as illustrated in FIG. 1 comprises an output node 12 at which an overlapping output clock pulse is to be developed, That output clock pulse is developed from a pair of sequentially spaced input signals respectively applied to a pair of input ports 14 and 16, these input signals being effective to actuate switch means arranged to develop the desired output signal at output node 12. The circuit also comprises a second output node 18 at which a second overlapping output clock pulse is developed from the same two input signals. Typical sequentially spaced input clock signals $\Phi_1$ and $\Phi_3$ are illustrated in FIGS. 2*a* and 2*b* respectively which graphically represent these signals in both their time and voltage relationships, time being represented on the horizontal axis and voltage being represented on the vertical axis. Each of the input clock signals $\Phi_1$ and $_3$ are normally at +12 volts and sequentially have a negative going operative portion at which that signal is at −12 volts. The negative pulse at each of the input clock signals is described as the "time" of that signal, that is, "$\Phi_1$ time" indicates the presence of the negative-going portion of the $\Phi_1$ input signal and "$\Phi_3$ time" correspondingly indicates the presence of the negative-going portion of the $\Phi_3$ input clock signal. The two overlapping output clock signals $\Phi_2$ and $\Phi_4$ developed respectively at output nodes 12 and 18** are respectively illustrated in FIGS. 2*c* and 2*d*, where it can be seen that clock signal $\Phi_2$ becomes negative at a level of approximately −8 volts at the onset of the negative going edge of $\Phi_1$ time and it remains so negative until the onset of $\Phi_3$ time. Thus, output clock signal $\Phi_2$ may be considered to be overlapping the input clock signal $\Phi_1$ and continuing in its negative operative level in the interval from the end of $\Phi_1$ time to the onset of $\Phi_3$ time. Similarly, output clock signal $\Phi_4$ may be considered as having its operative negative portion beginning at the onset of $\Phi_3$ time and continuing in its operative negative state until the onset of the subsequent $\Phi_1$ time.

The circuit also comprises a third output node 20 at which a third output signal designated $\Phi_{2r}$ is developed. The signal $\Phi_{2r}$ has a waveform shown graphically in FIG. 2*e*, the negative-going portion of −12 volts being developed only in the interval between the input clock signals $\Phi_1$ and $\Phi_3$.

The circuit comprises a first switch means here shown as comprising field effect transistor Q1 which receives at its gate the input clock signal $\Phi_1$ from input port 14 and is effective, when actuated during $\Phi_1$ time to operatively connect and charge the output node 12 to a source of negative voltage 22. Field effect transistor Q2 acts as a clamping switch means. It has its gate terminal connected to input node 24 and has its output circuit connected to the negative voltage source 22 so that when it is actuated by a suitable signal at its gate terminal, that is the signal applied thereto from input node 24, the conductive output circuit of transistor Q2 is effective to operatively connect the output mode 12 to the negative source 22, thereby effectively to clamp the signal at output node 12 at its negative level so long as the clamping transistor Q2 is turned on.

A second switch means is here shown as comprising field effect transistor Q3. Transistor Q3 has the input clock pulse $\Phi_3$ applied to its gate from input port 16 and is actuated at the onset of $\Phi_3$ time to operatively connect output node 12 to a positive source 26 through its conductive output circuit. The input node 24 is operatively connected to the positive source 26 through the output circuit of a switching device in the form of field effect transistor Q4. Transistor Q4 receives the input clock pulse $\Phi_3$ from input port 16 at its gate terminal and is effective to operatively connect input node 24 to positive source 26 when that transistor is turned on at the onset of $\Phi_3$ time.

The circuit so far described is substantially the same as that disclosed in the aforesaid Rubinstein et al. "Clock Generator" patent application. However, the circuit disclosed in that application was effective to connect the input node (here designated 24) to the source of negative voltage only during the period of the first input pulse, i.e. $\Phi_1$ time. During the interval between the two timed input signals (here designated as $\Phi_1$ and $\Phi_3$) that node was substantially "floating," that is, not operatively connected to the source of negative potential. It was found that as a result of this arrangement of the input node, feedthrough of positive signals from the external load circuits (not shown) receiving the output clock signals from output node 12 were coupled back through the interelectrode capacitance of the clamping transistor Q2 and onto the input node 24. If that feedback is sufficiently great, the signal level at input node 24 becomes insufficiently negative to provide a reliable turnon or actuating signal to the gate of the clamping transistor Q2,. As a result transistor Q2 is turned off and output node 12 is no longer affirmatively tied or clamped to the negative signal source 22 during the period between the two input clock signals. This in turn results (again as a result of feedback from the load circuits to the output node 12) in a degradation of the signal level at output node 12, thereby resulting in improper logic levels of the $\Phi_2$ output clock signal.

To overcome this deficiency of the aforesaid Rubinstein et al. circuit, the clock generator circuit of the present invention provides a conductive means in the form of a resistance 28 which is effective to operatively electrically connect input node 24 to the negative voltage source 22 at all times, and particularly in the interval between the input clock signals $\Phi_1$ and $\Phi_3$ to charge the input node 24 to its negative level and affirmatively maintain it there during that interval. The value of resistance 28 is preferably greater than the conducting resistance of the output circuit of transistor Q4 during the conducting period of the latter, that is, during $\Phi_3$ time. Hence, during $\Phi_3$ time input node 24 will charge through the path of least resistance provided by the conductive output circuit of transistor Q4 to the level of positive source 26. As a result, the resistance 28 is effective to connect and thus maintain input node 24 at its desired negative level for actuating transistor Q2 in the interval between $\Phi_1$ and $\Phi_3$ times. To make sure that the input node 24 remains charged at its desired positive level in the period between $\Phi_3$ time and the subsequent $\Phi_1$ time, input node 24 is also operatively connected to the positive voltage source 26 through an additional switch device in the form of a field effect transistor Q5 which receives at its gate the second output clock signal $\Phi_4$ which is derived at output node 18 in a manner to be described below.

When, as preferred field effect transistor switching devices are utilized in circuit 10 such devices are advantageously formed on a single chip of semiconductor material having a substrate region of one conductive type, the field effect transistors being formed by performing operations on selected regions of that substrate material to define the various regions of the switching devices. The resistance 28 is preferably a region formed on the chip by doping a region of that substrate with an impurity of a type which will produce a conductivity type opposite to that of the substrate. The value of the resistance of that region will be accurately controlled by varying the concentration of the impurities added to the substrate. It is also desired that the signal level at input node 24 reach its maximum negative level at the end of $\Phi_1$ time; hence the time constant of the charging path to the input node 24 (determined by the resistance 28 and the capacitance to ground of transistor Q2), must be sufficiently low. This requires that the value of resistance 28 be sufficiently low to insure that the maximum negative signal is developed at input node 24 at the end of $\Phi_1$ time. It will be noted that since input node 24 is connected through resistance 28 to the negative potential source 22, instead of through the output circuit of a field effect transistor as in the aforesaid Rubinstein et al. "Clock Generator" application, the signal level at node 24 does not experience a threshold voltage drop but is charged at the end of $\Phi_1$ time to substantially the full negative level of voltage source 22.

The second output signal $\Phi_4$ is produced at output node 18 by means of the switching operation of a pair of switching devices here shown as field effect transistors Q6 and Q7 which receive at their gate terminals input clock signals $\Phi_1$ and $\Phi_3$ respectively. The transistor Q7 is actuated during $\Phi_3$ time to operatively connect point 30, and thus output node 18, to a negative voltage source 22 to charge point 30 to a negative voltage. During the subsequent $\Phi_1$ time transistor Q6 is turned on to connect point 30 to the positive voltage source 26 to charge the signal at the output node 18 to a positive level, thereby developing the output signal $\Phi_4$ as shown in FIG. *2d*. It has been found that in the driving of load circuits using the four-phase clock signals here developed, there is a minimum amount of feedback to the $\Phi_4$ output node and hence a minimum and acceptable degree of feedback degradation. Hence, the affirmative clamping provided for the $\Phi_2$ output node 12 is not required at output node 18 in the period between the end of $\Phi_3$ time and the subsequent $\Phi_1$ time. If, however, it is found necessary to maintain the clock signal $\Phi_4$ at output node 18 at its desired operative level in the interval between the input clock pulses, that may be achieved by the provision of clamping circuitry similar to that herein disclosed at output node 12. Point 30, at which clock signal $\Phi_4$ is developed, is connected to the gate terminal of transistor Q5 so that, as described above, during $\Phi_4$ time, transistor Q5 is actuated to operatively connect input node 24 to the positive supply source 26, thereby insuring that input node 24 remains positive during $\Phi_4$ time and particularly in that portion of $\Phi_4$ time immediately following $\Phi_3$ time, and immediately prior to the onset of the subsequent $\Phi_1$ time.

It has been found in certain applications such as the "Read-Only Memory System" disclosed in the aforesaid copending application, that a third output clock signal known as the exclusive $\Phi_2$ ($\Phi_{2x}$) signal is required for the performance of certain system logic operations. It will further be noted that for a typical negative source of −12 volts, the maximum negative levels of output clock signals $\Phi_2$ and $\Phi_4$ are approximately −8 volts due to the respective threshold voltage drops in transistors Q1 and Q7. It is highly desirable for the maximum negative level of the exclusive Q2 signal to be increased to −12 volts. This is achieved by the operation of a NOR gate generally designated 32 which comprises three parallel gates in the form of field effect transistors Q8, Q9 and Q10. The output circuits of these transistors are arranged in parallel between the positive potential source 26 and a point 34 which is connected to output node 20 and to one terminal of a resistor 36, the other terminal thereof being connected to the negative voltage source 22. The resistor 36 may be defined by a P region formed on the same chip on which the other elements of the circuit are formed.

The control or gate terminals of the transistors Q8, Q9 and Q10 respectively have applied thereto the output clock signal $\Phi_4$ and the input clock signals $\Phi_3$ and $\Phi_1$ and are respectively actuated by the negative going portions of each of these signals. When any of transistors Q8 —Q10 is so actuated, output node 20 is connected through the output circuit of one or more of these transistors to the positive potential source 26. Thus, only in the period in which the clock signals $\Phi_4$, $\Phi_3$ and $\Phi_1$ are all positive, that is, only during the period between $\Phi_1$ and $\Phi_3$ times, are all of these transistors turned off. Hence, only at this time are output node 20 and point 34 operatively connected and effectively charged to the level of the negative source 22 through resistance 36. Thus, resistance 36 should have a resistance value greater than the output circuit conductive resistance of NOR gate 32, i.e. that of transistors Q8, Q9 and Q10.

The operation of the circuit 10 is as follows. At the onset of $\Phi_1$ time transistor Q1 is turned on so that output node 12 is operatively connected to negative source 22 through the output circuit of transistor Q1 and that node rapidly charges to its negative level. At that time, since both transistors Q4 and Q5 are turned off, input node 24 is charged through resistance 28 to a negative level and that negative level at input node 24 is applied to the gate of transistor Q2, to cause the latter to be turned on, thereby to operatively connect output node 12 to the negative supply through its output circuit. This provides an effective clamping action on the output node 12 during the interval between the input clock signals $\Phi_1$ and $\Phi_3$ as described above. Since there is no threshold drop across resistance 28, input node 24 will be able to charge to the fullest extent of source 22, that is, typically to −12 volts. As a result, input node 24 is less susceptible to the effect of the feedthrough of positive signals and it will continue to remain sufficiently negative to maintain transistor Q2 in its on condition until the onset of $\Phi_3$ time. At that time transistor Q4 is turned on and connects input node 24 through its output circuit to the positive voltage source 26 to charge input node 24 to a positive potential. At the same time transistor Q3 will be also turned on to operatively connect output node 12 to the positive source 26 and to charge node 12 to its positive operative level. Thus at the onset of $\Phi_3$ time the signal level at output node 12 becomes positive, it having been negative from the onset of $\Phi_1$ time until the onset of $\Phi_3$ time as desired. The input node 24 remains operatively connected to the positive supply line 26 through the output circuit of transistor Q5 during $\Phi_4$ time so that transistor Q2 is maintained in its off condition until the subsequent charging of input node 24 to its operative negative level at the subsequent $\Phi_1$ time.

The manner in which clock signals $\Phi_4$ and $\Phi_{2x}$ are developed at nodes 18 and 20 respectively is believed to be apparent from the above description of the circuits developing these signals.

The present invention has thus provided a clock generator circuit which internally develops two overlapping clock signals and has the capability of internally developing a third output signal in the interval between the input clock signals. One of the overlapping clock signals is maintained at its negative operative level during the interval between the two input clock signals by means of a clamping device which in turn is maintained in its conducting state by insuring that the circuit node, which supplies the control or actuating signal for the clamping device, is also affirmatively maintained at its operative level for clamping action. This arrangement insures that for demanding load and frequency requirements on the clock circuit, which would otherwise tend to produce erroneous clock signals at the output nodes due to signal feedthrough from the load circuits, the output clock signals developed by the circuit will be at their proper operative levels for the desired time intervals and will remain stable and substantially unaffected by the load conditions. Forming the clamping resistance region on the same chip of semiconductor material on which the remaining components of that circuit are formed enables the improvement in circuit operation to be achieved by relatively simple and inexpensive measures which require relatively minor alterations to the semiconductor material. The chip of semiconductor material on which this circuit is formed may also include the plurality of load circuits which receive the clock signals. The circuit has the capability of supplying such clock signals to a large number of load circuits and at higher clock frequencies than had heretofore been feasible while still reliably producing clock signals of the desired magnitude, sense and stability.

While only a single embodiment of this invention has been herein specifically disclosed, it will be apparent that variations may be made thereto without departing from the spirit and scope of the invention as defined in the following claims.

We claim:

1. In a clock circuit for generating an output signal having first and second levels from first and second sequential input signals having a time interval therebetween, said circuit comprising an input node, and output node at which said output signal is to be developed, first and second potential sources at said first and second levels respectively, first switch means effective when actuated to operatively connect said output node to said first potential source; the improvement which comprises, conductive means effective to connect said input node to said first potential source in the interval between said first and second input signals, and second switch means being effective to operatively connect said input node and said output node to said second potential source thereby to deactuate said first switch means to operatively disconnect said input node form said first potential source during said second input signal, and to charge said output node to said second level.

2. In the circuit of claim 1, in which said conductive means comprises a resistor having a greater resistance value than the conducting resistance of said second switch means.

3. In the circuit of claim 2, in which said circuit is formed on a chip of semiconductor substrate material of a given polarity, said resistor being defined by a region of semiconductor material on said chip of a polarity opposite to the polarity of said substrate material.

4. The circuit of claim 1, in which said second switch means comprises a first switch device operatively connected between said output node and said second potential source and effective when actuated to connect said output node to said second potential source, thereby to charge said output node to said second level, and a second switch device operatively connected between said input node and said second potential source and effective when actuated to connect said input node to said second potential source, thereby to charge said input node to said second level, said first and second switch devices being actuated by said second input signal.

5. The circuit of claim 3, in which said second switch means comprises a first switch device operatively connected between said output node and said second potential source and effective when actuated to connect said output node to said second potential source, thereby to charge said output node to said second level, and a second switch device operatively connected between said input node and said second potential source and effective when actuated to connect said input node to said second potential source, thereby to charge said input node to said second level, said first and second switch devices being actuated by said second input signal.

6. The circuit of claim 4 further comprising third switch means operatively connected between said input node and said second potential source, and effective when actuated to connect said input node to said second potential source, and means for actuating said third switch means in the interval between said second input signal and the next succeeding first input signal, thereby to charge said input node to said second level during said last-mentioned interval.

7. The circuit of claim 5, further comprising third switch means operatively connected between said input node and said second potential source, and effective when actuated to connect said input node to said second potential source, and means for actuating said third switch means in the interval between said second input signal and the next succeeding first input signal, thereby to charge said input node to said second level during said last mentioned interval.

8. In the circuit of claim 6 said actuating means further comprising a second output node, means for generating a second output signal at said second output node beginning at the onset of said second input signal and terminating at the onset of the next succeeding first input signal, and means for applying said second output signal to said third switch means, thereby to actuate the latter and to charge said input node to said second level during said second output signal.

9. In the circuit of claim 7, said actuating means further comprising a second output node, means for generating a second output signal at said second output node beginning at the onset of said second input signal and terminating at the onset of the next succeeding first input signal, and means for applying said second output signal to said third switch means, thereby to actuate the latter and to charge said input node to said second level during said second output signal.

10. In the circuit of claim 1, further comprising a third output node, and means for developing a third output signal at said third output node, said last mentioned means comprising second conductive means operatively connecting said third output node to said first potential source, and fourth, fifth, and sixth switch means respectively actuated by said first and second input signals and said second output signal, and effective when so actuated to operatively connect said third output node to said second potential source.

11. In the circuit of claim 10, in which said second conductive means comprises a second resistor.

12. In the circuit of claim 11, in which said second resistor is defined by a second region of semiconductor material formed on said chip.

13. In the circuit of claim 8, a third output node, and means for developing a third output signal at said third output node, said last mentioned means comprising second conductive means operatively connecting said third output node to said first potential source, and four, fifth, and sixth switch means respectively actuated by said first and second input signals and said second output signal, and effective when so actuated to operatively connect said third output node to said second source.

14. In the circuit of claim 13, said second conductive means comprising a second resistor.

UNITED STATES PATENT OFFICE

CERTIFICATE OF CORRECTION

Patent No. 3,564,299 Dated February 16, 1971

Inventor(s) Andrew G. Varadi et al.

It is certified that error appears in the above-identified patent and that said Letters Patent are hereby corrected as shown below:

Column 7, line 72, after "source" insert -- means for actuating said first switch means during said first input signal, said circuit comprising clamping means having a cont terminal operatively connected to said input node and effect when actuated to operatively connect said output node to sai first potential source; --. Column 8, line 3, "first switch" should read -- clamping --; same line 3, after "means" inser a comma; same line 3, "input" should read -- output --.

Signed and sealed this 14th day of September 1971.

(SEAL)
Attest:

EDWARD M.FLETCHER,JR.
Attesting Officer

ROBERT GOTTSCHALK
Acting Commissioner of Pate